(12) United States Patent
Igarashi

(10) Patent No.: US 9,034,503 B2
(45) Date of Patent: May 19, 2015

(54) BATTERY STORING DEVICE

(71) Applicant: YOKOGAWA ELECTRIC CORPORATION, Musashino, Tokyo (JP)

(72) Inventor: Youichi Igarashi, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 33 days.

(21) Appl. No.: 13/684,982

(22) Filed: Nov. 26, 2012

(65) Prior Publication Data

US 2013/0136971 A1 May 30, 2013

(30) Foreign Application Priority Data

Nov. 29, 2011 (JP) ................................ 2011-260315

(51) Int. Cl.
*H01M 2/10* (2006.01)

(52) U.S. Cl.
CPC .......... *H01M 2/1072* (2013.01); *H01M 2/1022* (2013.01); *H01M 2/105* (2013.01); *H01M 2/1027* (2013.01)

(58) Field of Classification Search
USPC .................................................. 429/96–100
See application file for complete search history.

(56) References Cited

U.S. PATENT DOCUMENTS

| 4,346,151 A | * | 8/1982 | Uba et al. .......................... 429/54 |
| 2008/0220324 A1 | * | 9/2008 | Phillips et al. ................. 429/120 |
| 2010/0285345 A1 | * | 11/2010 | Yang et al. ..................... 429/100 |

FOREIGN PATENT DOCUMENTS

| JP | 57-185167 U | 11/1982 | | |
| JP | 58-179751 U | 12/1983 | | |
| JP | 02-110169 U | 9/1990 | | |
| JP | 02-257567 A | 10/1990 | | |
| JP | 10-134785 A | 5/1998 | | |
| JP | 2004-172023 A | 6/2004 | | |
| JP | 2006-156125 A | 6/2006 | | |
| JP | 2006-196344 A | 7/2006 | | |
| JP | 2008-293874 | * 12/2008 | ............. | H01M 2/10 |
| JP | 2009-277513 | * 11/2009 | ............. | H01M 2/10 |
| JP | 2009-277513 A | 11/2009 | | |

* cited by examiner

*Primary Examiner* — Ula C Ruddock
*Assistant Examiner* — Osei Amponsah
(74) *Attorney, Agent, or Firm* — Sughrue Mion, PLLC

(57) ABSTRACT

A battery storing device may include: a case member having a positive terminal and a negative terminal and configured to store a battery therein; a positive pole coil spring in contact with a positive electrode of the battery; a negative pole coil spring in contact with a negative electrode of the battery; and a first support comprising a sidewall support section having an elastic force that is able to fix the battery while absorbing a size difference of the battery allowed according to a standard, and configured to support a sidewall of the battery.

17 Claims, 4 Drawing Sheets

BATTERY STORING DEVICE

BACKGROUND OF THE INVENTION

1. Field of the Invention

The present invention relates to a battery storing device configured to store a battery.

Priority is claimed on Japanese Patent Application No. 2011-260315, filed Nov. 29, 2011, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In a plant or a factory, a sensor apparatus such as a differential pressure transmitter or a temperature transmitter, a valve apparatus such as a flow rate control valve or an on-off valve, an actuator apparatus such as a fan or a motor, and other field devices are installed numerously. A conventional field apparatus is connected to a wired communication bus installed at a plant or the like, and transmission and reception of various signals are generally performed by wired communication. In recent times, a field apparatus (a wireless field apparatus) configured to perform transmission and reception of various signals through wireless communication is realized.

Since, in most cases, such a wireless field apparatus is installed alone at the plant or the like and can receive power distribution (for example, power distribution via a communication bus) from the outside, a battery is used as a power supply. Here, since a combustible gas may be used in the plant or the like, the battery used in the wireless field apparatus is mostly stored in a battery storing device satisfying an explosion-proof standard. Japanese Unexamined Patent Application, First Publication No. 2009-277513 discloses a battery storing device configured to store a battery in a state in which a positive pole and a negative pole are pressed by coil springs.

Here, since the battery storing device disclosed in Japanese Unexamined Patent Application, First Publication No. 2009-277513 is configured such that the battery is pressed by the coil spring, an instantaneous interruption or contact error due to vibrations can be prevented. However, since the battery cannot be sufficiently fixed through only a pressing force by the coil spring, when vibrations or impacts are applied to the battery storing device, the battery moves in the battery storing device to add further vibrations or impacts to the battery. Then, destruction or the like of a power device or a power collection mechanism in the battery may be generated to deteriorate the performance of the battery.

Here, when a shock absorbing material (for example, a silicon-based elastic body) conforming to a size of the battery stored in the battery storing device is installed in the battery storing device, the battery disposed in the battery storing device is considered to be sufficiently fixed to attenuate the vibrations or impacts applied to the battery. However, since a standard of the battery is defined to have a somewhat large clearance width, the size of the battery is currently different according to each manufacturer. For example, in a standard (IEC60086, JIS C 8500, etc.) related to a primary battery, a monotype (D size) battery is defined to have a diameter in a range of 32.2 to 34.2 mm, and a length in a range of 59.5 to 61.5 mm.

For this reason, even if the shock absorbing material appropriate for the size of the battery provided from a certain manufacturer is installed, when the size of the battery of another manufacturer to be stored in the battery storing device is small, the battery cannot be sufficiently fixed, and the vibrations or impacts may be applied to the battery and cause performance deterioration of the battery. On the other hand, when the size of the battery of the other manufacturer to be stored in the battery storing device is large, the battery cannot be stored in the battery storing device, or a large force is needed upon insertion and extraction of the battery and thus battery exchange cannot be easily performed.

SUMMARY

A battery storing device in accordance with the present invention can deal with batteries having different sizes according to manufacturers even using the same standard size by considering a clearance width defined in a battery standard. In addition, the battery storing device in accordance with the present invention is sturdy against vibrations or impacts, can prevent performance deterioration of the battery, and enables a user to easily exchange the battery.

A battery storing device (1) may include: a case member (10, 20) having a positive terminal (22a) and a negative terminal (22b) and configured to store a battery (B1, B2) therein; a positive pole coil spring (11a, 21a) in contact with a positive electrode of the battery (B1, B2); a negative pole coil spring (11b, 21b) in contact with a negative electrode of the battery (B1, B2); and a first support (30) comprising a sidewall support section (33) having an elastic force that is able to fix the battery (B1, B2) while absorbing a size difference of the battery (B1, B2) allowed according to a standard, and configured to support a sidewall of the battery (B1, B2).

The first support (30) may further include a first battery fixing section (31, 32) configured to support one end surface of the battery (B1, B2).

The sidewall support section (33) may include: a sidewall support member (33a) connected to one end of the first battery fixing section (31, 32) and in contact with the sidewall of the battery (B1, B2); and an elastic member (33b) configured to apply the elastic force with respect to the sidewall support member (33a).

The first battery fixing section (31, 32) may include: a plurality of fixing members (31a, 32a) disposed along an edge of the one end surface of the battery (B1, B2) and configured to support the one end surface of the battery (B1, B2); and a hole (31b, 32b) through which the positive pole coil spring (11a, 21a) and the negative pole coil spring (11b, 21b) are inserted.

The sidewall support member (33a) may be a plate-shaped member extending in a longitudinal direction of the battery (B1, B2) and having substantially the same length as the length in the longitudinal direction of the battery (B1, B2).

The sidewall support member (33a) may be a plate-shaped polycarbonate sheet (PC sheet) having stiffness.

The sidewall support member (33a) may include: a base section (P1) to which the elastic member (33b) is attached; and a tip section (P2) having a smaller width in a shorter direction than the base section (P1).

The elastic member (33b) may be a member installed near a joining section between the sidewall support member (33a) and the first battery fixing section (31, 32) and having a length which is about a half of the length in the longitudinal direction of the battery (B1, B2).

The elastic member (33b) may be a member formed of a rubber material in a bellows shape, and attached to both ends in a shorter direction of the sidewall support member (33a).

The elastic member (33b) may have a member having an M-shaped cross-section.

The case member (10, 20) may be configured to store a plurality of batteries (B1, B2) therein. The first support (30) may include: the plurality of first battery fixing sections (31, 32) connected according to disposition of the plurality of batteries (B1, B2) in the case member (10, 20); and the at least one sidewall support section (33) attached to a connecting section of the first battery fixing section (31, 32).

The case member (10, 20) may include: a first case member (10) in which the first support (30) is disposed; and a second case member (20) in which a second support (40) having a second battery fixing section (41, 42) configured to support the other end surface of the battery (B1, B2) is disposed.

A battery storing device (1) may include a first case member (10) and a second case member (20) and be configured to store a first battery (B1) and a second battery (B2) therein. The first case member (10) may include: a first positive pole coil spring (11a) in contact with a positive electrode of the first battery (B1); a first negative pole coil spring (11b) in contact with a negative electrode of the second battery (B2); and a first support (30) comprising a first battery fixing section (31, 32) configured to support first end surfaces of the first battery (B1) and the second battery (B2), and a sidewall support section (33) configured to support sidewalls of the first battery (B1) and the second battery (B2). The second case member (20) may include: a second positive pole coil spring (21a) in contact with a positive electrode of the second battery (B2); a second negative pole coil spring (21b) in contact with a negative electrode of the first battery (B1); and a second support (40) comprising a second battery fixing section (41, 42) configured to support second end surfaces of the first battery (B1) and the second battery (B2). In a state in which the first battery (B1) and the second battery (B2) are stored therein, the first case member (10) and the second case member (20) are fixed by fitting the first case member (10) and the second case member (20) and fastening a screw (N).

The sidewall support section (33) may include: a sidewall support member (33a) connected to one end of the first battery fixing section (31, 32) and in contact with sidewalls of the first battery (B1) and the second battery (B2); and an elastic member (33b) configured to apply the elastic force with respect to the sidewall support member (33a).

The sidewall support member (33a) may be a plate-shaped polycarbonate sheet (PC sheet) extending in a longitudinal direction of the first battery (B1) and the second battery (B2), having substantially the same length as that of the first battery (B1) and the second battery (B2) in the longitudinal direction, and having stiffness. The elastic member (33b) may be a member installed near a joining section of the sidewall support member (33a) and the first battery fixing section (31, 32), having a length which is about a half of the length of the first battery (B1) and the second battery (B2) in the longitudinal direction, and formed of a rubber material in a bellows shape.

According to the preferred embodiment of the present invention, since a sidewall of the battery having an elastic force that can fix the battery while absorbing a size difference of the battery allowed according to the standard is stored in a case in a state supported by a sidewall support section, performance deterioration of the battery due to the vibrations or impacts can be prevented, and the user can easily perform exchange of the battery.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

Figure 1:
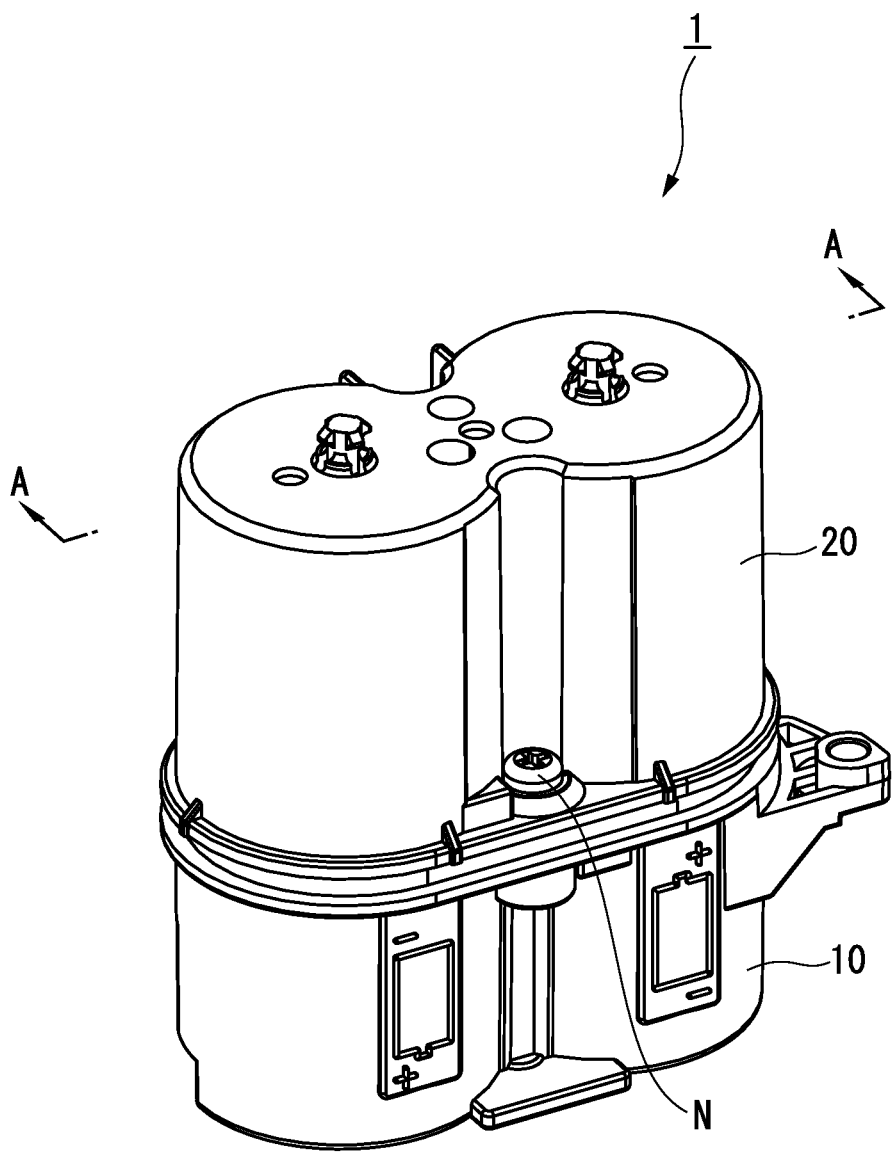
FIG. 1 is a perspective view showing a battery storing device in accordance with a first preferred embodiment of the present invention.

A battery storing device in accordance with a first preferred embodiment of the present invention will be described in detail. FIG. 1 is a perspective view showing the battery storing device in accordance with the first preferred embodiment of the present invention. As shown in FIG. 1, a battery storing device 1 includes a first case member 10, a second case member 20, and a screw N configured to fix the first case member 10 and the second case member 20. The first case member 10 is a battery case main body configured to store a battery. The second case member 20 is a cover of the battery case. The first case member 10 and the second case member 20 are integrated by fastening the screw N and constitute the battery case.

The battery storing device 1 uses, for example, a wireless field apparatus installed at a plant or a factory. For this reason, the battery storing device 1 is installed to satisfy an explosion-proof standard in the plant or the like.

Figure 2:
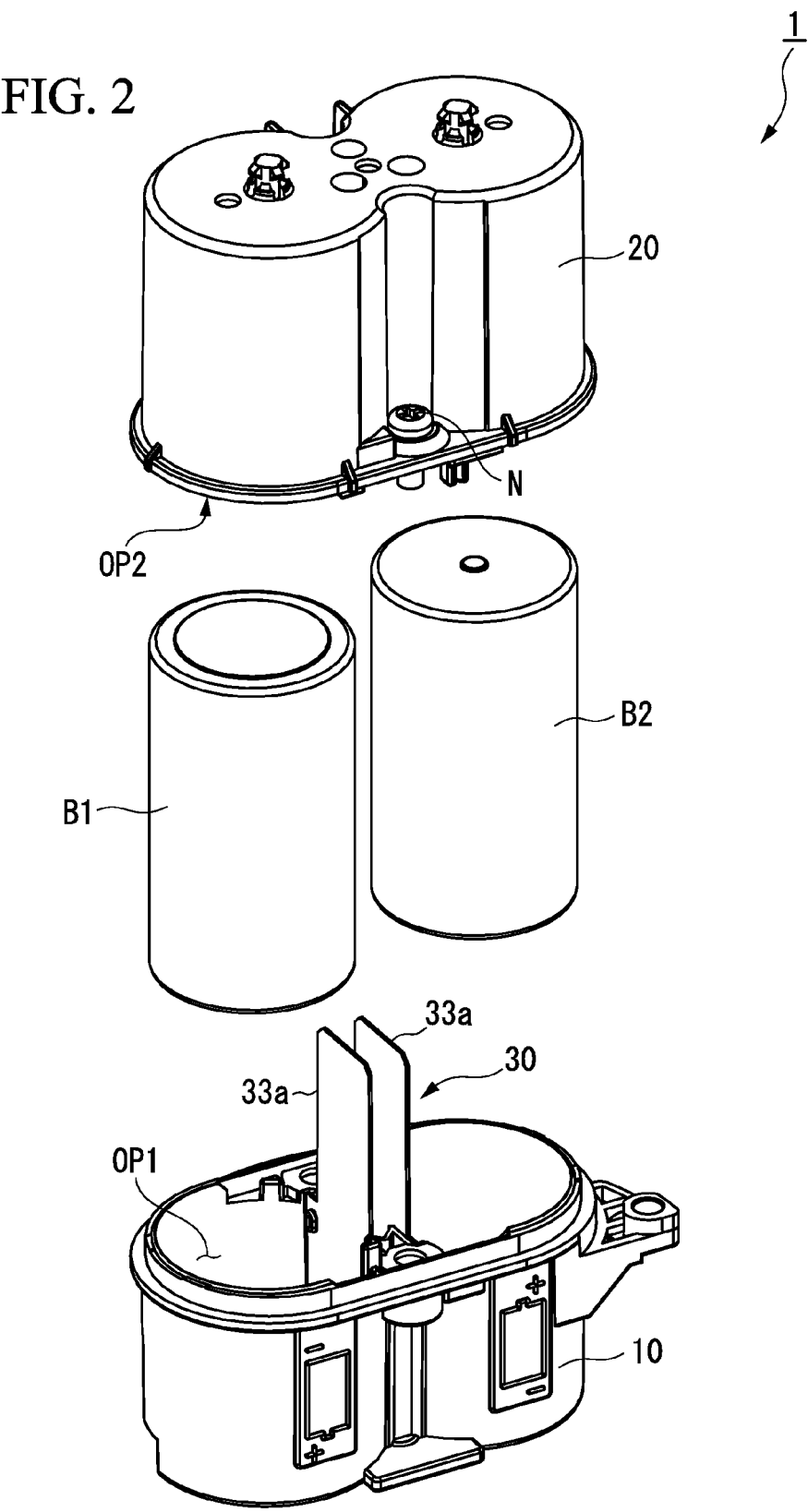
FIG. 2 is an exploded perspective view showing the battery storing device in accordance with the first preferred embodiment of the present invention.

FIG. 2 is an exploded perspective view showing the battery storing device in accordance with the first preferred embodiment of the present invention. The battery storing device 1 can store two batteries B1 and B2. The batteries B1 and B2 are, for example, cylindrical batteries such as a single battery or the like. As the screw N is loosened, as shown in FIG. 2, the first case member 10 and the second case member 20 are separated. The first case member 10 is, for example, a box-shaped member formed by molding a synthetic resin. An opening OP1 is formed in the first case member 10. The batteries B1 and B2 can be inserted into or extracted from the opening OP1. That is, the first case member 10 has a size that can store the batteries B1 and B2. The batteries B1 and B2 are detachable by separating the first case member 10 and the second case member 20 through separation of the screw N that fixes the first case member 10 and the second case member 20.

A battery support 30 is inserted into the first case member 10. The battery support 30 includes two sidewall support members 33a. The two sidewall support members 33a are disposed between the batteries B1 and B2 to support sidewalls of the batteries B1 and B2 with an elastic force that can fix the batteries B1 and B2 while absorbing a size difference of the batteries B1 and B2 allowed according to a standard.

In addition, in the drawings, while the case in which the battery storing device stores two batteries is shown, the number of batteries to be stored in the battery storing device of the present invention is not limited to two but one or three or more batteries may be stored.

Figure 3:
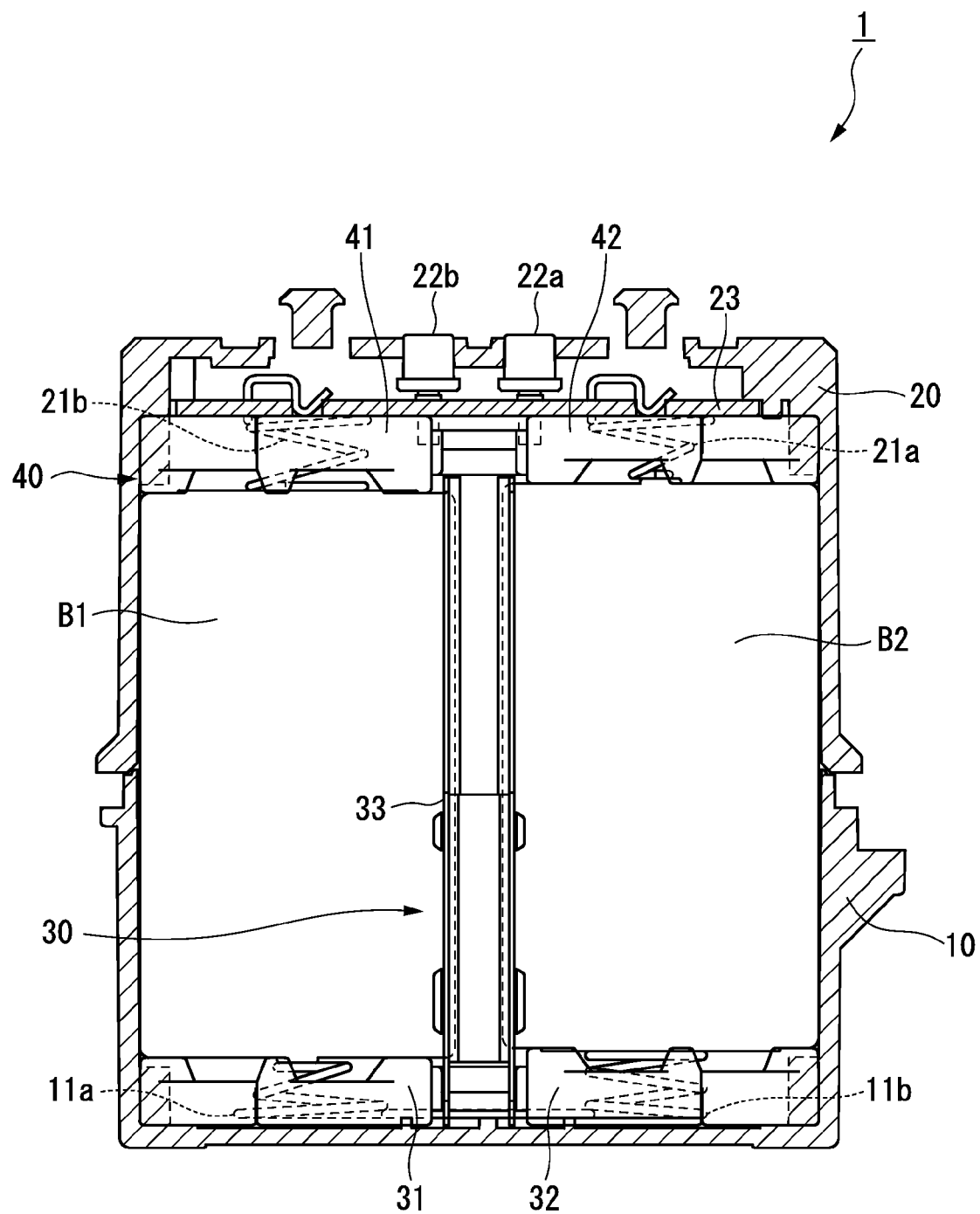
FIG. 3 is a cross-sectional view taken along line A-A of FIG. 1 of the battery storing device in accordance with the first preferred embodiment of the present invention.

FIG. 3 is a cross-sectional view taken along line A-A of FIG. 1 of the battery storing device in accordance with the first preferred embodiment of the present invention. As shown in FIG. 3, the battery storing device 1 according to the first preferred embodiment of the present invention includes the first case member 10, the second case member 20, the battery support 30, and a battery support 40. The battery storing device 1 can store the two batteries B1 and B2.

A positive pole coil spring 11a and a negative pole coil spring 11b are installed at an inner wall bottom surface of the first case member 10. The positive pole coil spring 11a fixes the battery B1. The negative pole coil spring 11b fixes the battery B2. In addition, the positive pole coil spring 11a and the negative pole coil spring 11b electrically connect the battery B1 and the battery B2.

One end of the positive pole coil spring 11a is electrically connected to one of the negative pole coil spring 11b. The other end of the positive pole coil spring 11a is electrically connected to a positive pole of the battery B1 when the battery B1 is mounted. The other end of the negative pole coil spring 11b is electrically connected to a negative pole of the battery B2 when the battery B2 is mounted. In addition, the positive pole coil spring 11a and the negative pole coil spring 11b may be integrally formed by metal or the like.

The second case member 20 is, for example, a box-shaped lid member formed by molding a synthetic resin as in the first case member 10. An opening OP2 configured to be fitted to the first case member 10 to cover the batteries B1 and B2 is formed in a lower section of the second case member 20. A positive pole coil spring 21a, a negative pole coil spring 21b, and a circuit board 23 are installed at an inner wall bottom surface of the second case member 20. A positive terminal 22a, a negative terminal 22b, and an electric element (not shown) such as a resistance element are attached to the circuit board 23.

The positive pole coil spring 21a fixes the battery B2. The negative pole coil spring 21b fixes the battery B1. The positive pole coil spring 21a electrically connects the battery B2 and the positive terminal 22a. The negative pole coil spring 21b electrically connects the battery B1 and the negative terminal 22b. Specifically, one end of the positive pole coil spring 21a is connected to the positive terminal 22a. When the battery B2 is mounted and the second case member 20 is fitted to the first case member 10, the other end of the positive pole coil spring 21a is electrically connected to the positive pole of the battery B2. One end of the negative pole coil spring 21b is connected to the negative terminal 22b. When the battery B1 is mounted and the second case member 20 is fitted to the first case member 10, the other end of the negative pole coil spring 21b is electrically connected to the negative pole of the battery B1. The positive terminal 22a and the negative terminal 22b are terminals configured to supply power to the batteries B1 and B2 stored in the battery storing device 1.

The battery support 30 is inserted into the first case member 10. The battery support 30 supports sidewalls of the batteries B1 and B2 and bottom surfaces (one end surfaces) of the batteries B1 and B2. In addition, the battery support 40 is inserted into the second case member 20. The battery support 40 supports upper surfaces (the other end surfaces) of the batteries B1 and B2. The batteries B1 and B2 are sandwiched between the battery supports 30 and 40 in a longitudinal direction of the batteries B1 and B2 to be stored in the battery storing device 1 in a state in which the sidewalls are supported by the battery support 30.

The battery support 30 includes a battery fixing section 31 configured to support a bottom surface of the battery B1, a battery fixing section 32 configured to support a bottom surface of the battery B2, and a sidewall support section 33 configured to support sidewalls of the batteries B1 and B2. The battery fixing sections 31 and 32 have the same shape as the bottom surfaces of the batteries B1 and B2 stored in the battery storing device 1 or a shape larger than the bottom surfaces of the batteries B1 and B2.

The battery support 40 includes a battery fixing section 41 configured to support an upper surface of the battery B1, and a battery fixing section 42 configured to support an upper surface of the battery B2. The battery fixing sections 41 and 42 are the same as the battery fixing sections 31 and 32 included in the battery support 30. The battery fixing sections 41 and 42 have the same shape as the upper surfaces of the batteries B1 and B2 stored in the battery storing device 1 or a shape larger than the upper surfaces of the batteries B1 and B2.

Figure 4:
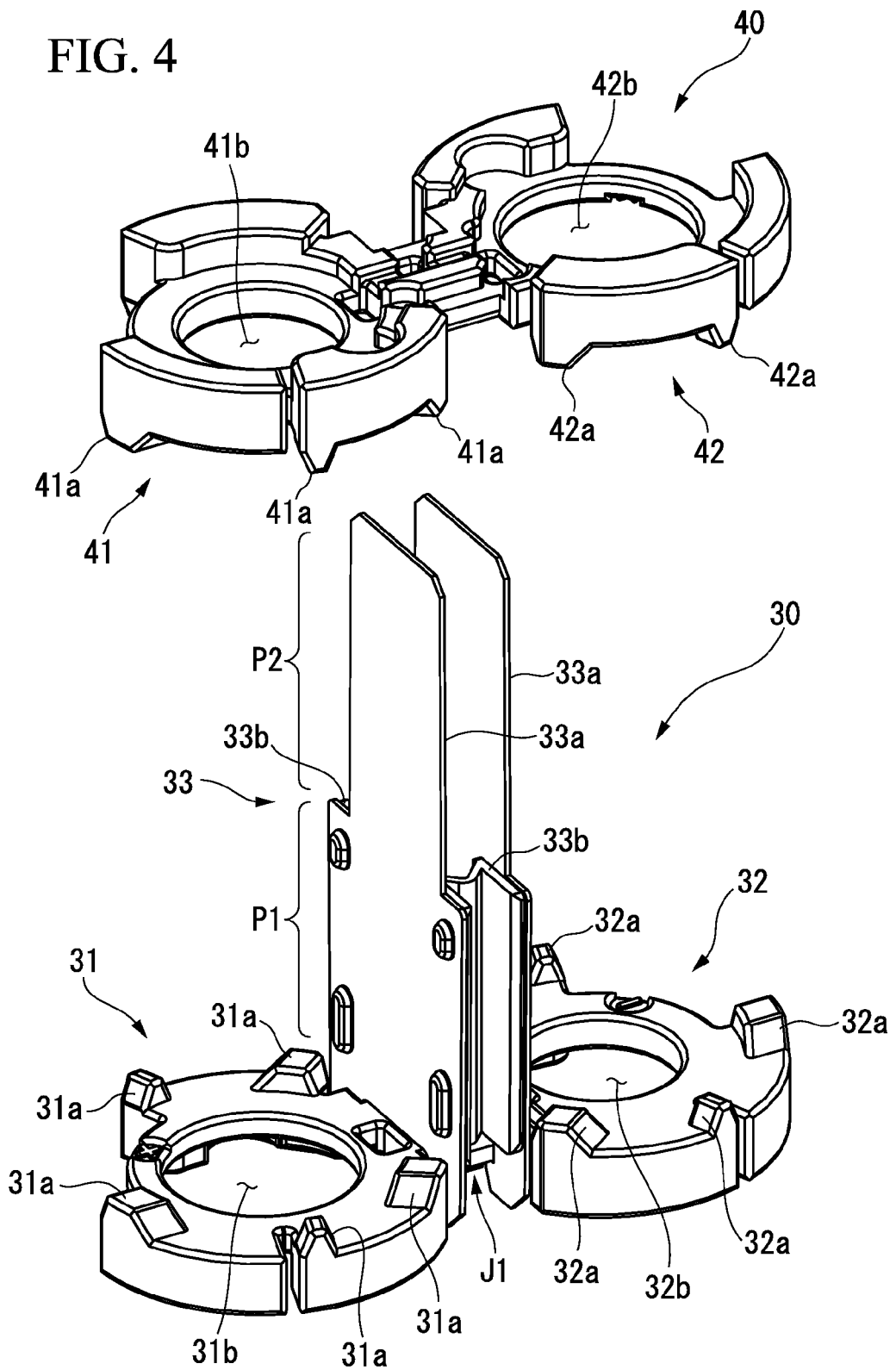
FIG. 4 is a perspective view showing a battery support included in the battery storing device in accordance with the first preferred embodiment of the present invention.

Hereinafter, the battery supports 30 and 40 will be sequentially described in detail. FIG. 4 is a perspective view showing the battery support included in the battery storing device in accordance with the first preferred embodiment of the present invention. As shown in FIG. 4, the battery support 30 includes the battery fixing section 31 configured to support the bottom surface of the battery B1, the battery fixing section 32 configured to support the bottom surface of the battery B2, and the sidewall support section 33 configured to support the sidewalls of the batteries B1 and B2. The battery fixing sections 31 and 32 have the same shape as the bottom surfaces of the batteries B1 and B2 stored in the battery storing device 1 or a shape larger than the bottom surfaces of the batteries B1 and B2.

Specifically, the battery fixing section 31 includes a plurality of fixing members 31a (five in an example shown in FIG. 4) installed along a circumferential edge of the upper surface, and a hole 31b installed at a central section. The fixing member 31a comes in contact with the bottom surface of the battery B1 inserted from the opening OP1 of the first case member 10, and supports the bottom surface of the battery B1. The hole 31b is a hole formed to provide electrical connection between the positive pole coil spring 11a and the battery B1. The hole 31b has a diameter larger than a diameter (a maximum diameter when seen from a plan view) of the positive pole coil spring 11a.

The battery fixing section 32 has, like the battery fixing section 31, a plurality of fixing members 32a (in the example shown in FIG. 4, five, the same as the fixing member 31a) installed along the circumferential edge of the upper surface, and a hole 32b formed at the central section. The fixing member 32a comes in contact with the bottom surface of the battery B2 inserted from the opening OP1 of the first case member 10, and supports the bottom surface of the battery B2. The hole 32b is a hole formed to provide electrical connection between the negative pole coil spring 11b and the battery B2. The hole 32b has a diameter larger than a diameter (a maximum diameter when seen from a plan view) of the negative pole coil spring 11b.

The battery fixing sections 31 and 32 are formed to be connected at each one end by a rubber material such as silicon rubber or the like. The positive pole coil spring 11a is inserted into the hole 31b formed in the battery fixing section 31. The negative pole coil spring 11b is inserted into the hole 32b formed in the battery fixing section 32. In this state, the battery fixing sections 31 and 32 are disposed in the inner wall bottom section of the first case member 10. The sidewall support section 33 extending in a longitudinal direction of the batteries B1 and B2 and configured to support the sidewalls of the batteries B1 and B2 is attached to a connecting section J1 of the battery fixing sections 31 and 32.

The sidewall support section 33 includes the two sidewall support members 33a and two elastic members 33b. The sidewall support section 33 is disposed between the batteries B1 and B2 stored in the battery storing device 1. The sidewall support section 33 supports the sidewalls of the batteries B1 and B2 with the elastic force that can and fix the batteries B1 and B2 while absorbing a size difference of the batteries B1 and B2 allowed according to a standard. For example, when the batteries B1 and B2 are monotype (D size) primary batteries, the sidewall support section 33 supports the sidewalls of the batteries B1 and B2 such that and the batteries B1 and B2 are not moved by the vibrations or impacts while absorbing a size difference of a range (a range of a diameter of 32.2 to 34.2 mm and a length of 59.5 to 61.5 mm) allowed according to a standard (IEC60086, JIS C 8500, etc.) related to a primary battery.

The sidewall support member 33a is a member which comes in contact with the sidewall of the battery B1 or the battery B2. The sidewall support member 33a is a flat polycarbonate sheet (PC sheet) having stiffness such that a length in the longitudinal direction of the batteries B1 and B2 is formed to substantially the same length as of the batteries B1 and B2. The sidewall support member 33a includes a base section P1 to which the elastic member 33b is attached, and a tip section P2 having a width in a shorter direction smaller than that of the base section P1. In addition, the sidewall support member 33a is not limited to the PC sheet but may be formed of another resin or metal.

The elastic member 33b is a member formed of a rubber material such as silicon rubber in a bellows shape. In the example shown in FIG. 4, the elastic member 33b is a member having an M-shaped cross-section. The elastic member 33b applies an elastic force that can fix the batteries B1 and B2 while absorbing a size difference of the batteries B14 and B2 with respect to the sidewall support member 33a. The elastic member 33b has a length which is about a half of the length of the batteries B1 and B2 in the longitudinal direction of the batteries B1 and B2. The elastic member 33b is attached to both ends (both ends in the shorter direction of the sidewall support member 33a) of the base section P1 to be sandwiched between the two sidewall support members 33a.

That is, the sidewall support member 33a extends in the longitudinal direction of the batteries B1 and B2, and both ends of the base section P1 are connected by the elastic member 33b to be parallel to or substantially parallel to each other. In addition, an elastic force in a direction crossing the surface is applied to the sidewall support member 33a by the elastic member 33b connecting them to each other. The sidewall support section 33 is attached to the connecting section J1 by engaging a lower end (a lower end of the base section P1) of the sidewall support member 33a to the connecting section J1 of the battery fixing section 31 and 32.

Accordingly, the sidewall support section 33 is disposed, as shown in FIG. 2, in a state in which, while the lower section (the base section P1 and the elastic member 33b of the sidewall support member 33a) is disposed in the first case member 10, the upper section (the tip section P2 of the sidewall support member 33a) extends from the opening OP1 of the first case member 10 to the outside. In addition, the elastic member 33b is installed close to a joining section of the sidewall support member 33a and the connecting section J1 of the battery fixing sections 31 and 32.

The battery support 40 includes the battery fixing section 41 configured to support the upper surface of the battery B1, and the battery fixing section 42 configured to support the upper surface of the battery B2. The battery fixing sections 41 and 42 are the same as the battery fixing sections 31 and 32 included in the battery support 30, and have the same shape as the upper surfaces of the batteries B1 and B2 stored in the battery storing device 1 or a shape larger than that of the upper surfaces of the batteries B1 and B2.

The battery fixing section 41 includes a plurality of fixing members 41a (five in the example of FIG. 4) installed along the circumferential edge of the bottom surface, and a hole 41b formed in the central section. The fixing member 41a is a member configured to come in contact with the upper surface of the battery B1 inserted into the first case member 10 and support the upper surface of the battery B1 when the second case member 20 is fitted to the first case member 10. The hole 41b is a hole formed to provide electrical connection between the negative pole coil spring 21b and the battery B1. The hole 41b has a diameter larger than that of the negative pole coil spring 21b (a maximum diameter when seen in a plan view).

The battery fixing section 42 includes, like the battery fixing section 41, a plurality of fixing members 42a (in the example shown in FIG. 4, five, the same as the fixing member 41a) installed along the circumferential edge of the bottom surface, and a hole 42b formed in the central section. The fixing member 42a is a member configured to come in contact with the upper surface of the battery B2 inserted into the first case member 10 and support the upper surface of the battery B2 when the second case member 20 is fitted to the first case member 10. The hole 42b is a hole formed to provide electrical connection between the positive pole coil spring 21a and the battery B2. The hole 42b has a diameter larger than that of the positive pole coil spring 21a (a maximum diameter when seen in a plan view).

The battery fixing sections 41 and 42 are formed to be connected at one ends by a rubber material such as silicon rubber or the like. The negative pole coil spring 21b is inserted into the hole 41b formed in the battery fixing section 41. The positive pole coil spring 21a is inserted into the hole 42b formed in the battery fixing section 42. In this state, the battery fixing sections 41 and 42 are disposed in the second case member 20. Specifically, the battery fixing sections 41 and 42 are disposed in the second case member 20 in a state in which the upper surface is in contact with the circuit board 23 to which the negative pole coil spring 21b and the positive pole coil spring 21a are attached.

According to the above-mentioned configuration, when the batteries B1 and B2 are inserted into the first case member 10, the sidewall support section 33 of the battery support 30 is deformed/bent. The batteries B1 and B2 are pressed in a direction of the sidewalls of the batteries to support the batteries B1 and B2 by a repulsive force of the sidewall support section 33 generated therefrom, positioning the batteries B1 and B2. After that, as the second case member 20 is covered on the first case member 10 and the screw N is fastened, the first case member 10 and the second case member 20 are fixed. Accordingly, the battery fixing sections 31 and 32 of the battery support 30 and the battery fixing sections 41 and 42 of the battery support 40 fix the batteries B1 and B2 from the longitudinal direction of the battery. Accordingly, the batteries B1 and B2 are strengthened with respect to the vibrations/impacts, and performance deterioration of the batteries B1 and B2 can be prevented.

Since a deformation and bending amount of the sidewall support section 33 of the battery support 30 is large, as the monotype (D size) batteries B1 and B2 having various sizes are pressed in the sidewall direction of the battery, the batteries B1 and B2 parallel or substantially parallel to each other can be positioned. Further, in the preferred embodiment of the present invention, the battery support 40 is added.

When the pressing in the sidewall direction of the battery by the sidewall support section 33 is strengthened, even though only the battery support 30 is provided without the battery support 40, strength with respect to the vibrations/impacts can be increased and performance deterioration of the battery can be prevented. However, when the monotype (D size) batteries B1 and B2 have a size within a standard range, insertion and extraction of the batteries B1 and B2 into/from the first case member 10 become difficult due to secure fixing, and easy battery exchange like the preferred embodiment of the present invention cannot be easily performed.

As described in the preferred embodiment of the present invention, even when the monotype (D size) batteries B1 and B2 having the size within the standard range is used by the configuration in which the battery support 40 is added, as the first case member 10 and the second case member 20 are fixed by fastening the screw N, the pressing in the longitudinal direction of the battery can be strengthened. Since the pressing is performed by fastening the screw N, easy battery exchange becomes possible.

When the sidewall support section 33 is not provided, the batteries B1 and B2 may be inclined and fixedly attached. As described in the preferred embodiment of the present invention, as the sidewall support section 33 is provided, the batteries B1 and B2 parallel or substantially parallel to each other can be positioned by the sidewall support section 33, and the pressing in the longitudinal direction of the battery is stabilized.

Next, a method of exchanging the batteries B1 and B2 stored in the battery storing device 1 as configured above will be described. First, an operator who performs an exchange operation of the batteries B1 and B2 unfastens the screw N configured to fix the first case member 10 and the second case member 20, separating the second case member 20 from the first case member 10. Then, the upper sections of the batteries B1 and B2 are exposed in a state in which the lower sections of the batteries B1 and B2 are inserted into the first case member 10. The operator grips and extracts the upper sections of the batteries B1 and B2 in this state. Then, the operator inserts new batteries B1 and B2 into the opening OP1 of the first case member 10 after completion of the extraction.

Here, when the new batteries B1 and B2 are inserted into the opening OP1 of the first case member 10, the new batteries B1 and B2 are inserted along the battery support 30 such that the longitudinal direction of the battery is parallel or substantially parallel to the sidewall support member 33a of the battery support 30 extending from the opening OP1 of the first case member 10 to the outside in a state in contact with the sidewalls of the batteries B1 and B2. Since an upper end P2 of the sidewall support member 33a is not connected by the elastic member 33b, the upper end is bent when a force in a direction crossing the surface is added. Accordingly, the upper end P2 of the sidewall support member 33a acts as a guide to introduce the batteries B1 and B2 into the first case member 10, and insertion of the batteries B1 and B2 into the first case member 10 can be easily performed.

When the battery B1 is inserted into the first case member 10 via the opening OP1, the positive pole coil spring 11a comes in contact with the bottom surface of the battery B1, and the battery B1 is supported by the positive pole coil spring 11a. Similarly, when the battery B2 is inserted into the first case member 10 via the opening OP1, the negative pole coil spring 11b comes in contact with the bottom surface of the battery B2, and the battery B2 is supported by the negative pole coil spring 11b. Accordingly, the batteries B1 and B2 are electrically connected.

Here, the batteries B1 and B2 are inserted into the first case member 10 in a state in which the sidewalls are in contact with the sidewall support member 33a. Here, the sidewall support member 33a can be bent in the shorter direction when the force in the direction crossing the surface with respect to the base section P1 is added, since both ends of the base section P1 are connected by the elastic member 33b. For this reason, the batteries B1 and B2 move along a radius of curvature of the sidewalls thereof to be supported at the surface by the sidewall support member 33a. Moreover, since an appropriate elastic force is applied to the sidewall support member 33a by the elastic member 33b, the batteries B1 and B2 are supported at the surface by the appropriate force by the sidewall support section 33.

When insertion of the batteries B1 and B2 into the first case member 10 is completed, the operator fixes the first case member 10 and the second case member 20 to cover the batteries B1 and B2 by fitting the first case member 10 and the second case member 20 and fastening the screw N. When the first case member 10 is fitted to the second case member 20, the negative pole coil spring 21b comes in contact with the upper surface of the battery B1, and simultaneously, the positive pole coil spring 21a comes in contact with the upper surface of the battery B2. Accordingly, the batteries B1 and B2 are serially connected between the positive terminal 22a and the negative terminal 22b.

When the operator performs screw fixing by the screw N in this state, the positive pole coil spring 11a and the negative pole coil spring 11b installed at the first case member 10 and the positive pole coil spring 21a and the negative pole coil spring 21b installed at the second case member 20 are commonly contracted. Then, the bottom surfaces of the batteries B1 and B2 come in contact with and are supported by the fixing members 31a and 32a installed at the battery fixing sections 31 and 32 of the battery support 30, respectively, and the upper surfaces of the batteries B1 and B2 come in contact with and are supported by the fixing members 41a and 42a installed at the battery fixing sections 41 and 42 of the battery support 40, respectively. Accordingly, the batteries B1 and B2 are stored in the battery storing device 1 in a state in which the bottom surfaces are supported by the battery support 30, the upper surfaces are supported by the battery support 40, and further, the sidewalls are supported by the sidewall support section 33 of the battery support 30.

As described above, in the first preferred embodiment of the present invention, the bottom surfaces of the batteries B1 and B2 are supported by the battery fixing sections 31 and 32 of the battery support 30, the upper surfaces of the batteries B1 and B2 are supported by the battery fixing sections 41 and 42 of the battery support 40, and the sidewalls of the batteries B1 and B2 are supported by the sidewall support section 33 of the battery support 30. Accordingly, even when a size difference is caused as the result of the manufacturer, the batteries B1 and B2 can be appropriately supported. In addition, the batteries B1 and B2 are not moved in the battery storing device 1 by the vibrations or impacts, and performance deterioration of the battery due to the vibrations or impacts can be prevented.

In addition, when the batteries B1 and B2 are inserted into the opening OP1 of the first case member 10, the sidewall support member 33a of the battery support 30 acts as a guide configured to introduce the batteries B1 and B2 into the first case member 10. Further, an appropriate elastic force is applied to the sidewall support member 33a by the elastic member 33b. For this reason, when the batteries B1 and B2 come in contact with the sidewall support member 33a of the battery support 30 to be inserted along the battery support 30, the batteries B1 and B2 can be easily inserted without a large force. Accordingly, even when a size difference is caused as the result of the manufacturer, the batteries B1 and B2 can be easily exchanged.

In the preferred embodiment, the positive pole coil springs 11a and 21a and the negative pole coil springs 11b and 21b are used as members configured to fix and electrically connect the batteries B1 and B2. However, a flat spring may be used instead of the coil spring.

In addition, in the preferred embodiment, an example in which the batteries B1 and B2 are sandwiched and held in the longitudinal direction of the battery by the battery supports 30 and 40, and the sidewalls of the batteries B1 and B2 are supported in a shorter direction by the battery support 30 has been described. However, when the batteries B1 and B2 can be substantially fixed in the longitudinal direction of the battery by the positive pole coil springs 11a and 21a and the negative pole coil springs 11b and 21b, the batteries B1 and B2 may be sandwiched and held in the longitudinal direction of the battery by the battery supports 30 and 40. That is, only the sidewalls of the batteries B1 and B2 may be supported by the battery support 30.

In addition, in the preferred embodiment, the example of the battery storing device capable of storing the two batteries B1 and B2 has been described. However, the present invention may also be applied to a battery storing device capable of storing one battery or a battery storing device capable of storing three or more batteries.

For example, in the case of the battery storing device configured to store one battery, a member including one battery fixing section and a sidewall support section attached to one end of the battery fixing section is used as the battery support 30. Further, a member including one battery fixing section is used as the battery support 40.

Furthermore, in the case of the battery storing device configured to store three or more batteries, a member including the same number of battery fixing sections as the number of batteries and the number (at least one) of sidewall support sections corresponding to the number of batteries or a storage type is used as the battery support 30. In addition, a member including the same number of battery fixing sections as the number of batteries is used as the battery support 40. Further, the storage type of the battery may be a type in which batteries are serially arranged and stored in one row, or a type in which batteries are arranged and stored in a plurality of rows.

As used herein, the following directional terms "forward, rearward, above, downward, right, left, vertical, horizontal, below, transverse, row and column" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A battery storing device comprising:
   a case member having a positive terminal and a negative terminal and configured to store a battery therein;
   a positive pole coil spring in contact with a positive electrode of the battery;
   a negative pole coil spring in contact with a negative electrode of the battery; and
   a first support comprising a sidewall support section having an elastic force that is able to fix the battery while absorbing a size difference of the battery allowed according to a standard, and configured to support a sidewall of the battery and a first battery fixing section configured to support one end surface of the battery, the first battery fixing section configured to allow the battery to be detachable along the sidewall support section,
   wherein the sidewall support section comprises:
   a sidewall support member that is a flat plate-shaped member extending in a longitudinal direction of the battery, a lower end of the sidewall support member being connected to one end of the first battery fixing section and in contact with the sidewall of the battery, a flat surface of the flat plate-shaped member of the sidewall support member supporting the battery; and
   an elastic member that is installed near a joining section, wherein the joining section is between the lower end of the sidewall support member and the first battery fixing section, the elastic member being configured to apply the elastic force to the battery through the sidewall support member.

2. The battery storing device according to claim 1, wherein the first battery fixing section comprises:
   a plurality of fixing members disposed along an edge of the one end surface of the battery and configured to support the one end surface of the battery; and
   a hole through which the positive pole coil spring and the negative pole coil spring are inserted.

3. The battery storing device according to claim 1, wherein the sidewall support member is a plate-shaped member extending in a longitudinal direction of the battery and having substantially the same length as the length in the longitudinal direction of the battery.

4. The battery storing device according to claim 1, wherein the sidewall support member is a plate-shaped polycarbonate sheet (PC sheet) having stiffness.

5. The battery storing device according to claim 1, wherein the sidewall support member comprises:
   a base section to which the elastic member is attached; and
   a tip section having a smaller width in a shorter direction than the base section.

6. The battery storing device according to claim 1, wherein the elastic member is a member installed near a joining section between the sidewall support member and the first battery fixing section and having a length which is about a half of the length in the longitudinal direction of the battery.

7. The battery storing device according to claim 1, wherein the elastic member is a member formed of a rubber material in a bellows shape, and attached to both ends in a shorter direction of the sidewall support member.

8. The battery storing device according to claim 1, wherein the elastic member has a member having an M-shaped cross-section.

9. The battery storing device according to claim 1, wherein the case member is configured to store a plurality of batteries therein, and
the first support comprises:
the plurality of first battery fixing sections connected according to disposition of the plurality of batteries in the case member; and
the at least one sidewall support section attached to a connecting section of the first battery fixing section.

10. The battery storing device according to claim 1, wherein the case member comprises:
a first case member in which the first support is disposed; and
a second case member in which a second support having a second battery fixing section configured to support the other end surface of the battery is disposed.

11. A battery storing device comprising a first case member and a second case member and configured to store a first battery and a second battery therein, wherein the first case member comprises:
a first positive pole coil spring in contact with a positive electrode of the first battery;
a first negative pole coil spring in contact with a negative electrode of the second battery; and
a first support comprising a first battery fixing section configured to support first end surfaces of the first battery and the second battery, and a sidewall support section configured to support sidewalls of the first battery and the second battery, the first battery fixing section supporting the first end surfaces of the first and second batteries, the first battery fixing section configured to allow the first battery to be detachable along the sidewall support section,
the sidewall support section comprises:
a sidewall support member that is a flat plate-shaped member extending in a longitudinal direction of the first and second batteries, a lower end of the sidewall support member being connected to one end of the first battery fixing section and in contact with the sidewalls of the first and second batteries, a flat surface of the flat-shaped member of the sidewall support member supporting the first battery; and
an elastic member that is installed near a joining section, wherein the joining section is between the lower end of the sidewall support member and the first battery fixing section, the elastic member being configured to apply the elastic force to the first battery through the sidewall support member,
the second case member comprises:
a second positive pole coil spring in contact with a positive electrode of the second battery;
a second negative pole coil spring in contact with a negative electrode of the first battery; and
a second support comprising a second battery fixing section configured to support second end surfaces of the first battery and the second battery, and
in a state in which the first battery and the second battery are stored therein, the first case member and the second case member are fixed by fitting the first case member and the second case member and fastening a screw.

12. The battery storing device according to claim 11, wherein
the sidewall support member is a plate-shaped polycarbonate sheet (PC sheet) extending in a longitudinal direction of the first battery and the second battery, having substantially the same length as that of the first battery and the second battery in the longitudinal direction, and having stiffness, and
the elastic member is a member installed near a joining section of the sidewall support member and the first battery fixing section, having a length which is about a half of the length of the first battery and the second battery in the longitudinal direction, and formed of a rubber material in a bellows shape.

13. The battery storing device according to claim 1, wherein
the first battery fixing section includes a plurality of fixing members installed along a circumferential edge of an upper surface of the first battery fixing section and a hole installed at a central section of the first battery fixing section,
the plurality of fixing members comes in contact with a bottom surface of the battery inserted from an opening of the case member and supports the bottom surface of the battery, and
the hole is formed to provide electrical connection between the positive pole coil spring and the battery, and has a diameter larger than a maximum diameter when seen from a plan view of the positive pole coil spring.

14. The battery storing device according to claim 13, wherein
the battery storing device is configured to store a plurality of batteries and includes a plurality of the first battery fixing sections, each of which corresponds to each of the plurality of batteries,
the plurality of first battery fixing sections are formed to be connected at each one end, and disposed so that the positive pole coil spring or the negative pole coil spring is inserted into the hole formed in the first battery fixing section, the plurality of first battery fixing sections being disposed in an inner wall bottom section of the case member, and
the sidewall support section extending in a longitudinal direction of the plurality of batteries and configured to support sidewalls of the plurality of batteries is attached to a connecting section of the plurality of first battery fixing sections.

15. The battery storing device according to claim 14, wherein
the sidewall support section includes a plurality of the sidewall support members and a plurality of the elastic members, and
the sidewall support section supports the sidewalls of the batteries such that and the batteries are not moved while absorbing a size difference of a range allowed according to a standard related to the batteries.

16. The battery storing device according to claim 1, wherein the sidewall support member is configured to act as a guide to introduce the battery into the case member.

17. The battery storing device according to claim 11, wherein the sidewall support member is configured to act as a guide to introduce the first battery into the case member.

* * * * *